US010611685B2

(12) United States Patent
Morano Rodriguez et al.

(10) Patent No.: US 10,611,685 B2
(45) Date of Patent: Apr. 7, 2020

(54) ADDITION FOR PRODUCING THERMALLY CONDUCTIVE MORTARS AND STRUCTURAL CONCRETE

(71) Applicants: Alfonso Javier Morano Rodriguez, Madrid (ES); Juan Pous De La Flor, Madrid (ES)

(72) Inventors: Alfonso Javier Morano Rodriguez, Madrid (ES); Juan Pous De La Flor, Madrid (ES)

( * ) Notice: Subject to any disclaimer, the term of this patent is extended or adjusted under 35 U.S.C. 154(b) by 0 days.

(21) Appl. No.: 15/572,509

(22) PCT Filed: May 13, 2016

(86) PCT No.: PCT/ES2016/000061
§ 371 (c)(1),
(2) Date: Nov. 13, 2017

(87) PCT Pub. No.: WO2016/180999
PCT Pub. Date: Nov. 17, 2016

(65) Prior Publication Data
US 2018/0118620 A1 May 3, 2018

(30) Foreign Application Priority Data

May 12, 2015 (ES) .................................. 201500346

(51) Int. Cl.
| | | |
|---|---|---|
| *C04B 20/00* | (2006.01) | |
| *C04B 28/04* | (2006.01) | |
| *C04B 40/00* | (2006.01) | |
| *C04B 14/02* | (2006.01) | |
| *C04B 14/04* | (2006.01) | |
| *C04B 14/28* | (2006.01) | |
| *C04B 18/08* | (2006.01) | |
| *C04B 18/14* | (2006.01) | |
| *C04B 18/24* | (2006.01) | |
| *C04B 24/28* | (2006.01) | |
| *C04B 111/00* | (2006.01) | |

(52) U.S. Cl.
CPC ........ *C04B 20/0092* (2013.01); *C04B 14/024* (2013.01); *C04B 14/026* (2013.01); *C04B 14/04* (2013.01); *C04B 14/28* (2013.01); *C04B 18/08* (2013.01); *C04B 18/146* (2013.01); *C04B 18/24* (2013.01); *C04B 24/28* (2013.01); *C04B 28/04* (2013.01); *C04B 40/00* (2013.01); *C04B 2111/00103* (2013.01); *C04B 2111/00465* (2013.01); *Y02W 30/92* (2015.05); *Y02W 30/94* (2015.05)

(58) Field of Classification Search
CPC ..... C04B 14/024; C04B 14/026; C04B 14/04; C04B 14/28; C04B 18/08; C04B 18/146; C04B 18/24; C04B 20/0092; C04B 24/28; C04B 28/04; C04B 40/00; C04B 2111/00103; C04B 2111/00465
See application file for complete search history.

(56) References Cited

U.S. PATENT DOCUMENTS

| | | |
|---|---|---|
| 6,251,179 B1 | 6/2001 | Allan |
| 8,617,309 B1 | 12/2013 | Carney et al. |
| 2007/0181040 A1* | 8/2007 | Li ........................... C04B 28/02 106/708 |
| 2014/0060388 A1* | 3/2014 | Sadiq .................... B82Y 30/00 106/644 |

FOREIGN PATENT DOCUMENTS

| | | | | |
|---|---|---|---|---|
| CN | 104402326 A | * | 3/2015 | |
| CN | 104513046 A | * | 4/2015 | |
| DE | 1002004039107 A1 | | 6/2005 | |
| KR | 101235641 B1 | * | 2/2013 | |
| WO | WO-2007088111 A1 | * | 8/2007 | ............. C04B 14/06 |
| WO | 2014198742 A1 | | 12/2014 | |

OTHER PUBLICATIONS

International Preliminary Report of Patentability, International Bureau of WIPO, dated Nov. 14, 2017.

* cited by examiner

*Primary Examiner* — Anthony J Green
(74) *Attorney, Agent, or Firm* — Patshegen IP LLC; Moshe Pinchas

(57) ABSTRACT

The invention relates to an addition for producing thermally conductive mortars and structural concrete, said addition being a specific powdery formulation in each case, which, when added as an addition to a conventional concrete or mortar, allows the production of a structural concrete or mortar with improved thermal characteristics (thermal conductivity λ). If the addition is added to a conventional concrete in a plant, a structural concrete with increased thermal conductivities is produced, which can adapt to the thermal requirements of the building, thereby being highly suitable for the heat activation of structures or the geothermal activation of foundations. The concrete containing the addition takes on special rheological characteristics which, inter alia, allows a self-compacting concrete to be produced. If the addition is added to a conventional mortar in a mixer, a mortar is produced with very high thermal conductivities which make it highly suitable for geothermal probes.

2 Claims, No Drawings

ADDITION FOR PRODUCING THERMALLY CONDUCTIVE MORTARS AND STRUCTURAL CONCRETE

SECTOR OF THE ART

The invention applies to the construction sector, particularly in the field of efficiency and sustainability of buildings with thermally and/or geothermally activated structures.

BACKGROUND OF THE INVENTION

Efficiency and sustainability in buildings pursuant to regulations or directives such as European "Directive 2010/31/EU of the European Parliament and of the Council of 19 May 2010 on the energy performance of buildings," introduces a new concept, "Nearly-Zero Energy Buildings," which uses TABS (Thermally Activated Building System) for climate control and cooling, this system consists of the thermal activation of the concrete structure of the building, offering a path for the passage of heat to exchangers, which may or may not be geothermal, or both. The concretes currently used to activate these structures are the same concretes commonly used to build structures, this seriously undermines the effectiveness of the active structures due to their poor thermal properties, making it an inadequate product. The reason for this situation is that any change in the thermal properties of the concrete would cause a considerable loss of mechanical resistance, rendering its use as structural concrete impossible, and structural safety must prevail.

The documents studied, such as US2009294743 and MXPA05011139, describe how to obtain electrically (not thermally) conductive concretes, but do not obtain them by means of an additive, but rather a concrete formulation. Document US2011155019 does use an additive, but for obtaining a concrete resistant to fire and high temperatures. And, inter alia, most offer solutions for thermal concretes aimed at improving thermal insulation by reducing thermal conductivity, as in documents WO2014006194, CN103570291, CN104108913, WO2013151439, etc., but not increasing it, precisely the opposite of those obtained in this invention. But of all these, none apply the additive solution to the concrete or mortar to obtain a thermally conductive structural concrete or thermally conductive mortar. The thermal additive is a unique product, whereby a thermal structural concrete having resistant capacity for a structural concrete and thermal properties different to those of any concrete and mortars with very high thermal characteristics are obtained. These properties are especially suitable for use in geothermally activated foundations with very low enthalpy and/or for thermally activated concrete structures or also for injection mortars in geothermal probes.

EXPLANATION OF THE INVENTION

The addition is a powder formulation that, when mixed with a conventional concrete when it is manufactured, allows to obtain a structural concrete with improved thermal characteristics (thermal conductivity $\lambda$). Likewise, when mixed with conventional mortars, thermally conductive mortars with very high thermal characteristics are obtained, particularly in the case of injection mortars in geothermal probes.

With respect to the addition to concrete, depending on the thermal needs of the building or the characteristics of the terrain, the amount of addition may be increased or decreased in conventional concrete, or the dosage of the addition constituents may be modified to adapt the thermal conductivity of the concrete, but preserving its structural nature. These improved thermal characteristics make it highly suitable for the thermally structures active buildings and/or for geothermal activation in the foundations of a building, obtaining greater efficiency and improved sustainability thereof.

With respect to the addition to mortar, depending on the thermal needs of the building or the characteristics of the terrain, the amount of addition may be increased or decreased in conventional mortar, or the dosage of the addition constituents may be modified to adapt the thermal conductivity of the mortar. These improved characteristics make the mortar highly suitable for injection mortars in geothermal probes, although the use of the addition in other mortars is not ruled out.

The addition is a product specifically formulated in each case, where by varying or removing one or several of the constituents of the addition its properties will be modified, particularly the thermal conductivity of the concrete. Said properties may be determined by the specific standards.

The thermal structural addition consists of three to six components depending on the thermal needs:

Fine aggregates (calcareous or siliceous) with a grain size of 4 mm, in a proportion that varies between 0% and 95% with respect to total weight aggregates (calcareous or siliceous) with a grain size of, less than 0.064 mm in a proportion between 0% and.

95% with respect to total weight.

Polycarboxylate ether-based superplasticizers powder additive or derivatives thereof. Up to 15% with respect to total weight.

Cellulose ether-based viscosity modulator or derivatives thereof. Up to 10% with respect to total weight.

Thermal conductivity natural or synthetic graphite. Up to 45% with respect to total weight.

Graphene and/or carbon nanotubes. Up to 20% with respect to total weight.

Pozzolanic material ranging between 0% to 95% with respect to total weight.

This addition is added to conventional concrete in the mixer of a concrete plant which, knowing its dosage (cement, water, coarse aggregates, fine aggregates, admixture and/or other additions). The constituents of the addition are adjusted according to the background and, finally, the amount of addition per $m^3$ of concrete is determined. For example, if an increase in conductivity in the concrete is required, the graphite and/or the graphene content in the addition would be increased and the filler would be adjusted to obtain a very compact concrete. Given the characteristics of the addition, the concrete obtains special rheological characteristics that, inter alia, make it possible to obtain a self-compacting concrete and, therefore, a greater compact and density concrete that conventional concrete.

It can also be added to any mortar, but especially injection mortars in geothermal probes. There is no need to obtain mechanical resistance, but there is a need to improve thermal characteristics and injectability, therefore the content of the fine aggregate is reduced or fully substituted with the filler.

PREFERRED EMBODIMENT OF THE INVENTION

Although the possible total dosages may be very high depending on needs, particularly those relating to mechanical resistances and conductivities, a preferred embodiment would be that concrete for the foundations of a building with geothermia where there is a need to activate said foundations in order to use the geothermia for efficient and renewable climate control, without heavy investment in a probe field to fully supplement climate control and possible sanitary hot water (SHW) needs.

If a conventional concrete typified or designated as HA-30/8/20/IIb is that used, it is advisable for the cement used to be of the cement type; if using other type cement, preliminary verifications must be made to avoid possible unexpected interactions.

In conventional concrete, it is not necessary to modify the dosage of the cement, the usual worksite additives (plasticizers), coarse aggregates and fine aggregates. But the amount of water or w/c (water/cement) ratio is possible to make an adjustment as a consequence of mixing with the thermal addition.

For each m$^3$ of conventional concrete indicated (2,500 kg/m$^3$), in this preferred embodiment 50 kg of addition are added per m$^3$ of conventional concrete.

The addition containing (5 constituents):

80% of calcareous fine aggregates 1.9% of superplasticizer additive 0.1% of viscosity modulator additive 5% of finely powdered conductive graphite When added to the described concrete, a structural concrete with a w/c ratio of 0.57 was obtained, with average resistances greater than 55 MPa, very dense and self-compacting. The thermal conductivity λ of approximately 3.5 W/(K·m) is very convenient for a granite terrain, such as that of the preferred embodiment.

The invention claimed is:

1. An addition for thermally conductive structural concretes and conductive mortars, characterized in that it contains the following components:

80% of calcareous fine aggregate with respect to total weight, with particle sizes less than or equal to 4 mm Polycarboxylate ether based super plasticizer powder additive or derivatives thereof in a proportion of 1.9% of total weight Cellulose ether based viscosity modulator or derivatives thereof in a proportion of 0.1% of total weight powdered graphite in a proportion of 5% of total weight, with size less than 1 mm and with carbon content >80%.

2. A method for obtaining greater or lesser conductivity of concrete or mortar the method comprising:

adding a thermal addition, including the following components:

80% of calcareous fine with respect to total weight, with particle sizes less than or equal to 4 mm Polycarboxylate ether based super plasticizer powder additive or derivatives thereof in a proportion of 1.9% of total weight Cellulose ether based viscosity modulator or derivatives thereof in a proportion of 0.1% of total weight powdered graphite in a proportion of 5% of total weight, with size less than 1 mm and with carbon content >80% modifying the proportions of the components, or adding a greater or lesser amount of thermal addition to the concrete or mortar to obtain thermally conductive structural concretes and thermally conductive mortars.

* * * * *